(12) United States Patent
Accardo et al.

(10) Patent No.: US 10,694,263 B2
(45) Date of Patent: *Jun. 23, 2020

(54) DESCRIPTIVE METADATA EXTRACTION AND LINKAGE WITH EDITORIAL CONTENT

(71) Applicant: Disney Enterprises, Inc., Burbank, CA (US)

(72) Inventors: Anthony M. Accardo, Glendale, CA (US); Skarphedinn S. Hedinsson, Stevenson Ranch, CA (US); Aljosa Aleksej Andrej Smolic, Aargau (CH); Miquel A. Farré Guiu, Bern (CH); Thabo D. Beeler, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/178,135

(22) Filed: Nov. 1, 2018

(65) Prior Publication Data

US 2019/0082235 A1 Mar. 14, 2019

Related U.S. Application Data

(63) Continuation of application No. 14/526,071, filed on Oct. 28, 2014, now Pat. No. 10,299,012.

(51) Int. Cl.
| | |
|---|---|
| *H04N 21/8358* | (2011.01) |
| *H04N 21/234* | (2011.01) |
| *H04N 21/658* | (2011.01) |
| *H04N 21/81* | (2011.01) |

(52) U.S. Cl.
CPC ... *H04N 21/8358* (2013.01); *H04N 21/23418* (2013.01); *H04N 21/6581* (2013.01); *H04N 21/8133* (2013.01)

(58) Field of Classification Search
None
See application file for complete search history.

(56) References Cited

U.S. PATENT DOCUMENTS

| | | | |
|---|---|---|---|
| 6,470,378 B1 | 10/2002 | Tracton et al. | |
| 8,978,075 B1* | 3/2015 | Kaiser | H04N 5/44 725/105 |
| 2010/0119208 A1* | 5/2010 | Davis | H04N 5/765 386/291 |
| 2011/0063509 A1* | 3/2011 | Karaoguz | G06F 3/0304 348/563 |

(Continued)

*Primary Examiner* — Fernando Alcon
(74) *Attorney, Agent, or Firm* — Patterson + Sheridan, LLP

(57) ABSTRACT

Embodiments provide techniques for distributing supplemental content based on content entities within video content. Embodiments include analyzing video data to identify a known content entity within two or more frames of the video data. For each of the two or more frames, a region of pixels within the respective frame is determined that corresponds to the known content entity. Embodiments further include determining supplemental content corresponding to the known content entity. A watermark is embedded at a first position within the video data, such that the watermark corresponds to an identifier associated with the determined supplemental content. Upon receiving a message specifying the identifier, embodiments include transmitting the supplement content to a client device for output together with the video data.

20 Claims, 7 Drawing Sheets

(56) References Cited

U.S. PATENT DOCUMENTS

| | | |
|---|---|---|
| 2013/0024532 A1 | 1/2013 | Lee et al. |
| 2014/0123204 A1 | 5/2014 | Moon et al. |
| 2014/0285717 A1* | 9/2014 | Cai .................. H04N 21/23418 348/571 |
| 2015/0121435 A1* | 4/2015 | Wang ................. H04N 21/4131 725/81 |
| 2015/0319506 A1 | 11/2015 | Kansara et al. |
| 2016/0119655 A1 | 4/2016 | Accardo et al. |
| 2016/0119691 A1 | 4/2016 | Accardo et al. |

* cited by examiner

DESCRIPTIVE METADATA EXTRACTION AND LINKAGE WITH EDITORIAL CONTENT

CROSS-REFERENCE TO RELATED APPLICATIONS

This application is a continuation of co-pending U.S. patent application Ser. No. 14/526,071, filed on Oct. 28, 2014, which is herein incorporated by reference in its entirety.

BACKGROUND

Field of the Invention

The present disclosure relates to providing media content, and more specifically, to techniques for embedding data within video content for use in retrieving supplemental content corresponding to a content entity depicted within the video content.

Description of the Related Art

A number of different techniques exist today for delivering video content to users. Generally speaking, existing systems for delivering video content, such as over-the-air broadcasts, cable television service, Internet television service, telephone network television service, satellite television service, satellite radio service, websites, etc., provide a relatively impersonalized, generic experience to all viewers. For example, with respect to broadcast television, all viewers of a given television network station receive essentially the same content in essentially the same order.

In addition to providing the video content to users, content providers can also provide supplemental content that corresponds to content entities shown in the video content. For instance, a particular scene of the video content could show a particular actor playing a particular fictional character, and supplemental content about the particular fictional character could be provided along with the video content. For example, such supplemental content could include concept art and a biography for the fictional character. Moreover, such supplemental content can be shown for other content entities within the video content, such as places, objects, and so on.

Currently, the identification of such content entities within content video and the linking of such content entities to supplemental content are largely manual processes. For example, a user could manually watch the video content and generate data specifying content entities appearing within the video content and a time range(s) at which the content entities appear. The user could further select supplemental information pertaining to the content entity within the video content and could make this supplemental information available when the video content is later viewed (e.g., by inserting a link within the video content to a web page containing the supplemental information). However, such a manual process is inefficient, and moreover such a process is static in nature, as subsequent updates to the selected supplemental information and the links to such information remain manual operations.

SUMMARY

Embodiments provide a method, non-transitory medium and system for providing supplemental content for an instance of video data to a client device. The method, non-transitory medium and system include analyzing video data to identify a known content entity within two or more frames of the video data. Additionally, the method, non-transitory medium and system include determining, for each of the two or more frames, a region of pixels within the respective frame that correspond to the known content entity. The method, non-transitory medium and system also include determining supplemental content corresponding to the known content entity. Furthermore, the method, non-transitory medium and system include embedding a watermark at a first position within the video data, such that the watermark corresponds to an identifier associated with the determined supplemental content. Upon receiving a message specifying the identifier, the method, non-transitory medium and system include transmitting the supplemental content to a client device for output together with the video data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
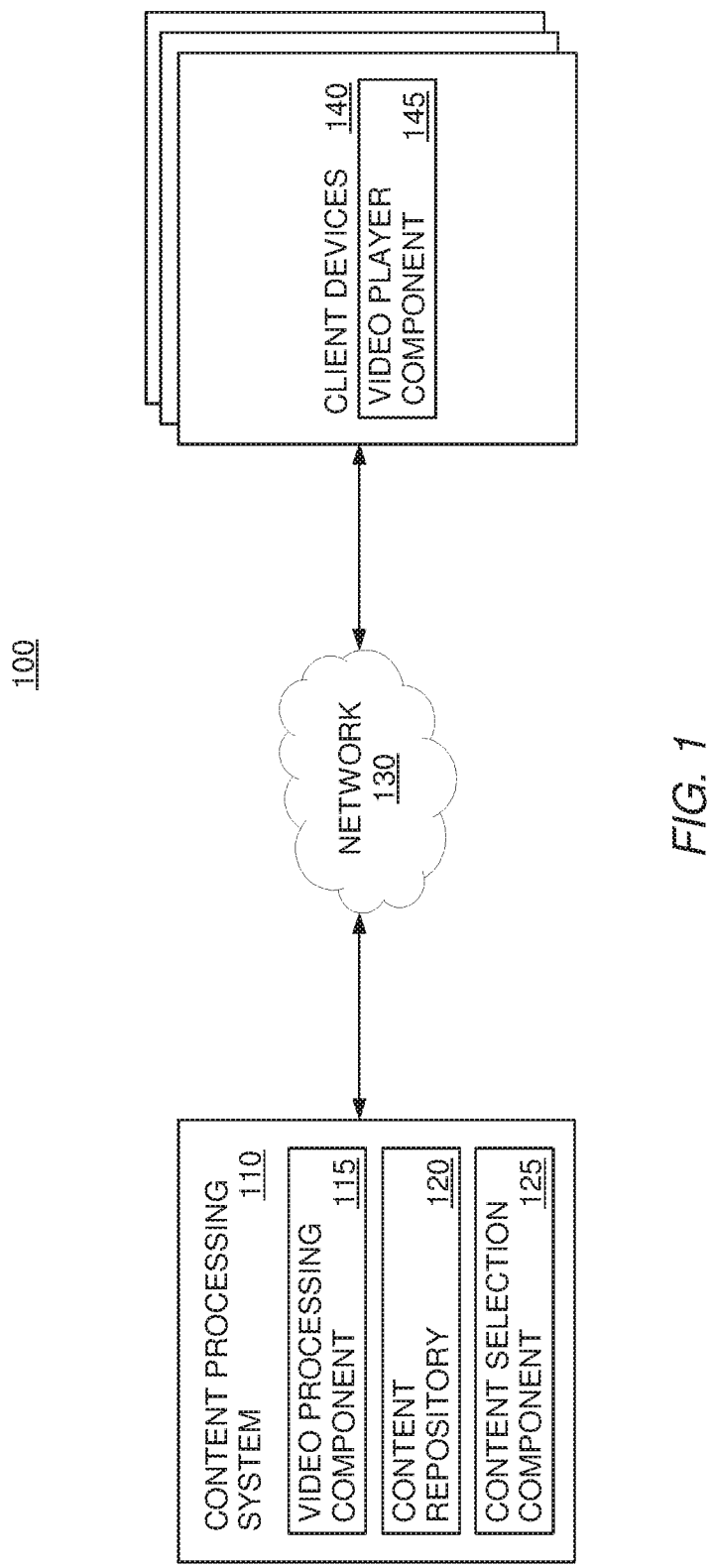
FIG. 1 is a block diagram illustrating a content processing system configured with a video processing component and a content selection component, according to one embodiment described herein.

Embodiments generally provide a comprehensive solution for automatically identifying content entities (e.g., actors, characters, objects, places, etc.) within video content and embedding watermarks within the video content that can be used to retrieve supplemental content (e.g., biographies, images, videos, etc.) for display during playback of the video content. As used herein, a content entity refers to any entity depicted within one or more frames of a video. For example, a content entity can be an actor appearing within a series of frames of a video. Another example of a content entity can be a fictional (or non-fictional) character that the actor is portraying within a series of frames of a video. Still another example of a content entity can be an object within a series of frames of a video that corresponds to a particular character (e.g., a doll depicting a cartoon character). As yet another example, a content entity can be a location shown within frames of a video (e.g., Paris). Of course, such examples are without limitation and are provided for illustrative purposes only, and more generally a content entity can be any entity depicted within at least one frame of video content.

Supplemental content, as used herein, refers to any content that is related to a content entity. Examples of such supplemental content include, without limitation, images, videos, audio files, textual content and so on. For instance, the supplemental content for a particular actor (i.e., a content entity) could include biography information for the actor, news articles about or related to the actor, video clips involving or related to the particular actor, audio files associated with the actor (e.g., an interview with the actor, a podcast that mentions the actor, etc.) and so on. More generally, supplemental content refers to any content have a relation to a content entity.

One embodiment provide techniques for embedding a watermark within an audio stream of video content for use in retrieving supplemental content corresponding to a content entity depicted within the video content. Such an embodiment includes analyzing video data to identify a known content entity within two or more frames of the video data. For example, embodiments could determine that a particular actor appears within a particular series of frames within the video data. Additionally, embodiments could determine, for each of the two or more frames, a region of pixels within the respective frame that correspond to the known content entity. Continuing the example, embodiments could identify a region of pixels within each frame of the series of frames that depict the particular actor within the frames.

Once the known content entity is identified within the frames of the video, embodiments could determine supplemental content corresponding to the known entity. For example, where the known content entity comprises a particular actor, embodiments could identify biographical information, images, sound clips, and so on corresponding to the particular actor. More generally, however, any form of supplemental content corresponding to the known content entity can be determined, and these examples are provided for illustrative purposes only and without limitation.

Embodiments could also embed a watermark at a first position within the video data, such that the watermark corresponds to an identifier associated with the determined supplemental content. In one embodiment, the watermark comprises an audio watermark inserted into an audio stream of the video data at the first position. For example, where the known content entity was identified within a series of frames of the video data, the watermark could be embedded at a position within the video data that corresponds to a first frame of the series of frames containing the known content entity.

Additionally, an identifier could be associated with the determined supplemental content. For instance, the identifier could be a timestamp corresponding to the first frame at which the watermark was inserted. The watermarked video content could later be transmitted by a server system to a client device for playback. Upon laying the watermarked video content and detecting the embedded watermark, the client device could transmit a message to the server system specifying the identifier associated with the watermark. Upon receiving the message, embodiments could transmit the supplement content to the client device for output together with the video data.

FIG. 1 is a block diagram illustrating a content processing system configured with a video processing component and a content selection component, according to one embodiment described herein. As shown, the system 100 includes a content processing system 110 connected to a plurality of client devices 140 by network 130. The content processing system 110 includes a video processing component 115, a content repository 120 and a content selection component 125. Of note, while the content processing system 110 is shown as a single entity in the system 100, the content processing system 110 in one embodiment comprises multiple separate computing devices. These separate computing devices can be located, for instance, within a single computing network, or can be located on different computing networks and even in different geographic location.

Generally, the video processing component 115 is configured to analyze video data to identify a known content entity within two or more frames of the video data and to determine, for each of the two or more frames, a region of pixels within the respective frame that correspond to the known content entity. As discussed above, the known content entity can generally be any content entity the video processing component 115 is configured to recognize. Examples of such content entities can include, without limitation, a person (e.g., an actor), a character (e.g., a fictional or non-fictional character portrayed by the actor), an object (e.g., a toy representing a particular cartoon character), a geographic location (e.g., the city of Paris), textual information (e.g., a sign for a particular business) and so on.

The video processing component 115 could then embed a watermark at a first position within the video data, such that the watermark corresponds to an identifier associated with the determined supplemental content. For instance, the video processing component 115 could embed the watermark in an audio stream of the video data at the first position. In a particular embodiment, the video processing component 115 is configured to embed the watermark in a video stream of the video data.

The content processing system 110 could then, at some subsequent point in time, transmit the watermarked video data to one of the client devices 140 for playback by the video player component 145. The video player component 145 could then begin the playback of the watermarked video data and could detect the watermark within the video data at the first position. The video player component 145 could then transmit an identifier corresponding to the detected watermark to the content selection component 125. For example, the identifier could comprise a timestamp for the first position within the video data at which the watermark was detected.

Upon receiving a message specifying the identifier, the content selection component 125 could determine supplemental content corresponding to the known content entity within the content repository 120. For instance, the content repository 120 could comprise a database storing supplemental content, e.g., images, videos, audio, and other data files, and the content selection component 125 could be configured to query the database to retrieve supplemental content associated with the known content entity corresponding to the received identifier. As an example, where the known content entity is a particular fictional character, the supplemental content could include video clips from other movies the fictional character has been depicted in, textual information describing the fictional character, images of the fictional character, commercial products relating to the fictional character, and so on.

In one embodiment, the content selection component 125 can tailor the selection of supplemental content based on the client containing the video player component 145. For example, the client could transmit a client identifier in addition to the identifier corresponding to the detected watermark, and upon receiving the client identifier, the content selection component 125 could use the client identifier or information associated with the client identifier (e.g., a device type corresponding to the client identifier) to search for and retrieve the supplemental content. In one embodiment, the content selection component 125 is configured to take into account preference information (e.g., information describing user preferences for a user associated with the client device) in selecting the supplemental content. For instance, the content selection component 125 could be more likely to select instances of content or types of content that the user has shown a particular affinity for, and less likely to select content or types of content that the user has historically disliked or otherwise been uninterested in. In a particular embodiment, the content selection component 125 is configured to use the client identifier to determine content that a user corresponding to the client identifier has access to, and to select the supplemental content as a subset of the accessible client. For instance, if the user has a license to view a particular set of content items but does not have rights to view another set of content items, the content selection component 125 could select the supplemental content items to return to the user only from the particular set of content items the user has rights to view.

Once the supplemental content is determined, the content selection component 125 could transmit the supplement content to the client device 140 for output by the video player component 145 together with the video data. For instance, the video player component 145 could provide an overlay over the playback of the video data that includes one or more links to instances of the supplemental content. As another example, the video player component 145 could output an interface that includes the supplemental content (or a link to the supplemental content) along with the playback of the video data. Doing so allows for supplemental content to be dynamically retrieved and displayed, based on the watermark embedded within the video data.

Figure 2:
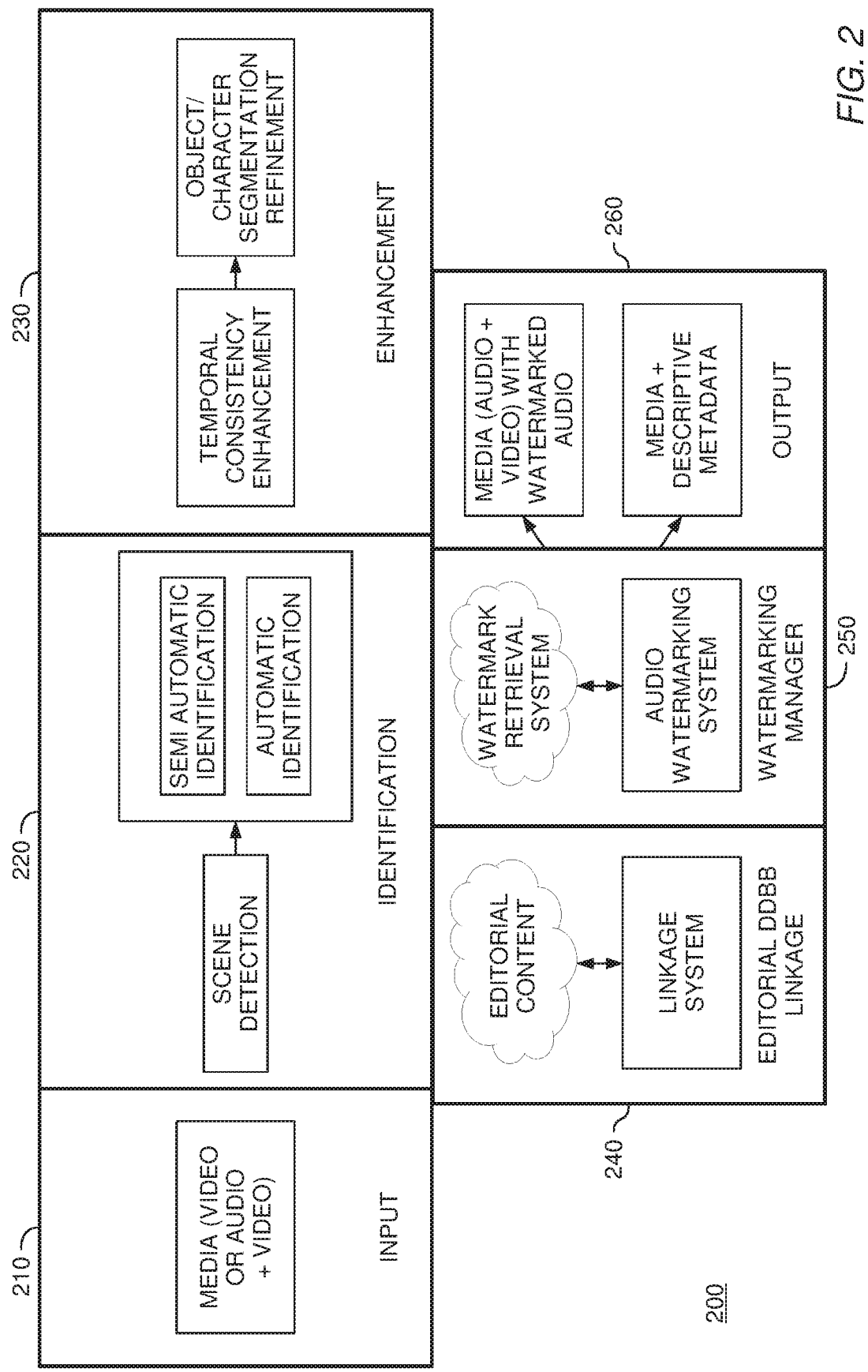
FIG. 2 is a block diagram illustrating a processing workflow for detecting content entities within a video stream and embedding watermarks at positions corresponding to the content entities, according to one embodiment described herein.

FIG. 2 is a block diagram illustrating a processing workflow for detecting content entities within a video stream and embedding watermarks at positions corresponding to the content entities, according to one embodiment described herein. As shown, the system 200 includes an input stage 210, an identification stage 220, an enhancement stage 230, an editorial content linkage stage 240, a watermarking manager stage 250 and an output stage 260.

Generally, the input stage 210 represents the selection of media content for processing by the video processing component 115. For example, a user could specify an indication of media content using a unique identifier corresponding to the media content, e.g., a path and filename corresponding to a particular file, a unique resource identifier (URI) for a web resource, etc. In one embodiment, the video processing component 115 is configured to automatically select the media content to be processed. For example, the video processing component 115 could be configured to automatically select a next instance of media content from a particular location, e.g., a folder in a filesystem.

During the identification stage 220, the video processing component 115 analyzes the instance of media content identified during the input stage 210, in order to identify a known content entity within frames of the media content. For example, the video processing component 115 could analyze the frames of an instance of video content in order to identify a particular actor within a sequence of frames. Additionally, the video processing component 115 could identify a region of pixels within each of the frames in the sequence of frames that corresponds to the identified known content entity (e.g., the particular actor).

In such determinations, the video processing component 115 could perform an automatic identification of the known content entity. For instance, the video processing component 115 could search the frames of the video content to determine whether any regions of pixels match one of a plurality of predefined images of the known content entity (e.g., images of an actor's face). Once the video processing component 115 identifies a depiction of a known content entity within one of the frames, the video processing component 115 could analyze the frames surrounding the frame to determine whether these surrounding frames also contain depictions of the known content entity. That is, if a particular actor is seen throughout a scene of the video data, the video processing component 115 could identify all the frames of the scene that include a depiction of the particular actor.

In one embodiment, the video processing component 115 is configured to perform a semi-automatic identification of the known content entity within the frames of the video. For instance, the video processing component 115 could provide a user interface that a user could use to specify an area of a frame. For example, the user could use a drawing tool to outline a region of a frame that corresponds to a known content entity depicted within the frame. The video processing component 115 could then analyze the specified region to determine which known content entity is depicted within the region of the frame. By having the user specify a specific region of a frame that corresponds to a known content entity, the video processing component 115 can focus its analysis on the specified region, thereby improving the accuracy of the identification of the known content entity.

Once the video processing component 115 has identified a sequence of frames, the video processing component 115 then performs enhancement and/or refinement operations in the enhancement stage 230. For instance, the video processing component 115 can perform a temporal consistency enhancement across the frames of the video. For example, a depiction of a particular actor could be identified within frames 1 through 10 and 12 through 20 of the video data, and the video processing component 115 could determine that it is likely the particular actor also appears in frame 11 of the video data, even though the initial analysis of frame 11 did not detect a depiction of the particular actor within the frame. By optimizing the identified frames with respect to time, embodiments can provide a more consistent result across the frames of the video content.

Additionally, the video processing component 115 can perform an object/character segmentation refinement operation as well. Here, the video processing component 115 can analyze the region of pixels in each frame of the identified sequence of frames and can optimize the identified regions of pixels with respect to both space and time, thereby providing a more consistent result. For example, the video processing component 115 could identify a relatively large region of pixels within several frames of the video data that correspond to a particular known content entity, but could identify only a smaller region of pixels corresponding to the known content entity within an adjacent frame of the video data. In the enhancement stage, the video processing component 115 could adjust the regions of pixels across the identified frames to normalize the identified regions of pixels, thereby improving the consistency of the identification across the video data.

In the editorial linkage stage 240, the content selection component 125 identifies supplemental content associated with the known content entity detected within the frames of the video data. For example, the supplemental content could include images, audio, video, and other data related to the known content entity. The content selection component 125 can then create a link between the identified supplemental content and the identified sequence of frames within the video data. For example, the content selection component 125 could create the linkage to the supplemental content using a timestamp associated with the first frame of the sequence, such that the timestamp can subsequently be used to quickly retrieve the supplemental content.

The video processing component 115, during the watermarking manager stage 250, embeds a watermark into the video data at a position corresponding to the identified sequence of frames containing the depiction of the known content entity. For example, the video processing component 115 could embed a watermark within an audio stream of the video content at a position corresponding to the first frame of the sequence of frames. The timestamp at which the watermark is embedded could then subsequently be used to, e.g., accessed the linked supplemental content identified during the editorial linkage stage 240. While an audio watermark is described in this example, more generally, any watermark embedded within the video content capable of being used to identify the linked supplemental content can be used, consistent with the functionality described herein.

At the output stage 260, the video processing component 115 outputs the video content containing the embedded watermark. Additionally, the video processing component 115 can be configured to output metadata describing the analysis of the video content. For instance, such metadata can specify any known content identified within the video data, and can further specify sequences of frames in which the known content entity (or entities) appear. Such metadata can be used to provide a summary of the content entities within the video content as well as the scenes within the video content. In one embodiment, the metadata is stored directly within the video content. In an alternate embodiment, the content selection component 125 is configured to store the metadata together with a token that can be used to retrieve the video content.

Figure 3:
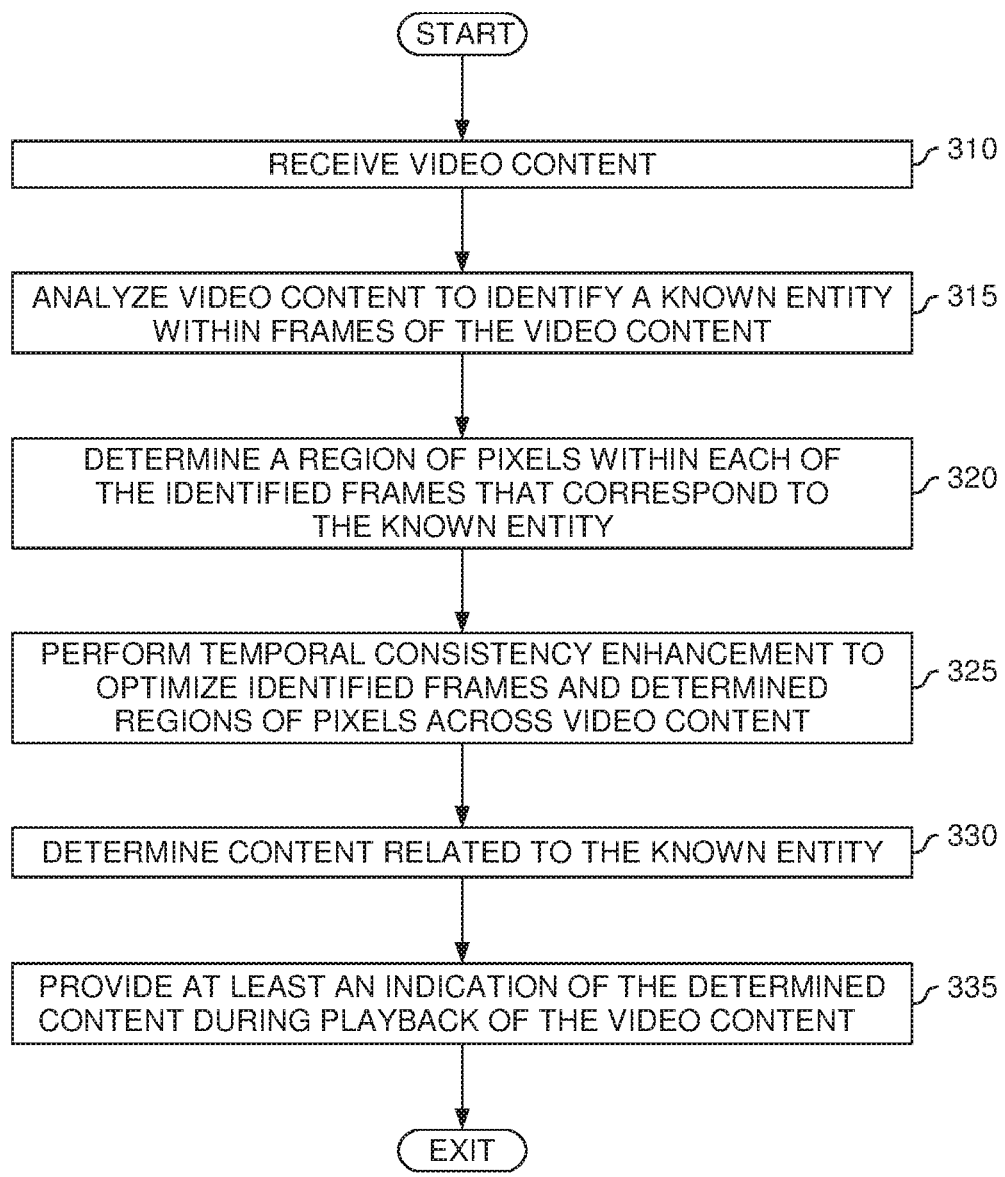
FIG. 3 is a flow diagram illustrating a method for identifying a content entity within a video stream and determining supplemental content related to the content entity, according to one embodiment described herein.

FIG. 3 is a flow diagram illustrating a method for identifying a content entity within a video stream and determining supplemental content related to the content entity, according to one embodiment described herein. As shown, the method 300 begins at block 310, where the video processing component 115 receives video content to be analyzed. The video processing component 115 then analyzes the received video content to identify a known content entity within frames of the video content (block 315).

Upon identifying a known content entity within a series of frames, the video processing component 115 determines a region of pixels within each of the identified frames that corresponds to the known content entity (block 320). As discussed above, the video processing component 115 can be configured to automatically determine the region of pixels within each of the frames (e.g., by searching for regions of the frames that substantially match predefined images of the known content entity). In one embodiment, the video processing component 115 performs a semi-automatic determination of the region of pixels. For instance, user could outline (e.g., using an input device and a graphical user interface of the video processing component 115) a region of pixels within one of the frames as corresponding to a particular content entity, and the video processing component 115 could use the specified region of pixels to identify similar regions of pixels within the surrounding frames of the video content.

The video processing component 115 then performs a temporal consistency enhancement to optimize the identified frames and determined regions of pixels across the entirety of the video content (block 325). For instance, the video processing component 115 could perform a temporal consistency refinement operation across the frames of the video data to capture frames in which the known content entity was not explicitly identified in but is likely to appear within. For example, if the video processing component 115 determines that the known content entity was identified within all but one of a particular sequence of frames, the video processing component 115 could determine that the known content entity is likely depicted within the remaining frame as well.

The video processing component 115 could also be configured to perform refinement operations for the identified regions of pixels. For example, while a depiction of a known content entity could reside within a region of pixels in a particular frame, the video processing component 115 could have identified only a portion of the region of pixels due to imperfections in the identification analysis. However, if the video processing component 115 determines that the determined region of pixels within the particular frame differs significantly in size and/or shape relative to the determined region of pixels in the adjacent frames, the video processing component 115 could adjust the determined regions of pixels to be more consistent across the frames of the video data. Advantageously, doing so can help offset imperfections in the automatic (or semi-automatic) identification of the depictions of the known content entity across the frames of the video data.

Additionally, the content selection component 125 determines supplemental content related to the known content entity (block 330). For example, the content selection component 125 could generate and submit a query to a database management system, where the query identifies the known content entity and is adapted to retrieve content from a database corresponding to the known content entity. The content selection component 125 further provides at least an indication of the determined supplemental content during the playback of the video content on a client device (block 335), and the method 300 ends.

Figure 4:
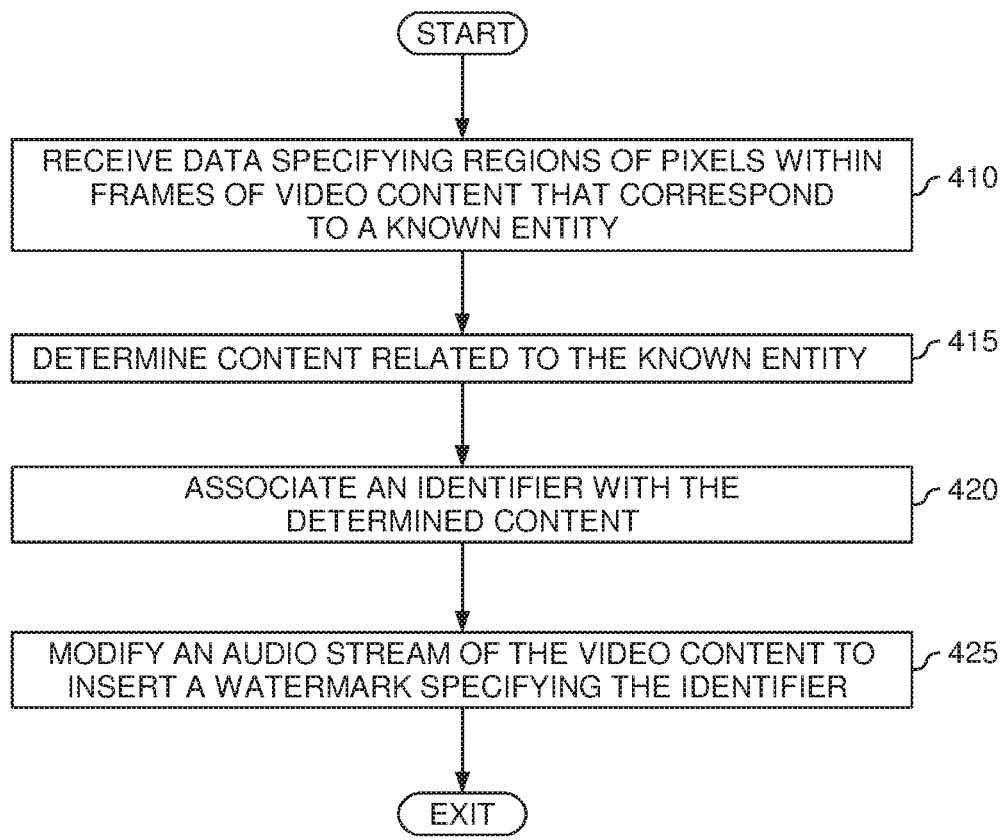
FIG. 4 is a flow diagram illustrating a method for embedding a watermark at a position within an audio stream corresponding to frames in which a content entity was detected, according to one embodiment described herein.

FIG. 4 is a flow diagram illustrating a method for embedding a watermark at a position within an audio stream corresponding to frames in which a content entity was detected, according to one embodiment described herein. As shown, the method 400 begins at block 410, where the video processing component 115 receives data specifying regions of pixels within frames of video content that correspond to a known content entity. For example, the video processing component 115 could provide a user interface in which a user can specify a region of one or more frames of the video content (e.g., using a stylus or other input/output device). In a particular embodiment, the video processing component 115 is configured to analyze the video content in order to determine the region of pixels. For example, the video processing component 115 could be configured to analyze frames of the video content in order to identify regions of pixels corresponding to people within the frames.

The video processing component 115 then determines content related to the known content entity (block 415). For example, the video processing component 115 could query a content selection component 125 to retrieve related content from a data store, e.g., a database. As discussed above, such content can include any content related to the known content entity, with examples including (without limitation) images, videos, audio, information (e.g., biographical information), and so on.

The video processing component 115 then associates an identifier with the determined content (block 420). In one embodiment, the video processing component 115 is configured to associate the identifier with the known content entity and the position in the video content at which the pixels corresponding to the known content entity appear. For example, the video processing component 115 could create a link between a watermark identifier (e.g., a time stamp corresponding to the first frame of a sequence of frames within the video data) and the determined content, such that the watermark identifier can be used to quickly access the determined content. In one embodiment, the video processing component 115 creates the link between a time stamp and an identifier of the known content entity, such that the identifier can subsequently be retrieved and used to search (e.g., within a database) for supplemental content associated with the known content entity.

The video processing component 115 then modifies an audio stream of the video content to insert a watermark specifying the identifier (block 425), and the method 400 ends. For example, the video processing component 115 could insert the watermark at a position within the audio stream corresponding to the frames in which the known content entity was detected. A client device, upon detecting the watermark within the audio stream, could then transmit a watermark identifier (e.g., a timestamp at which the watermark was detected) to the video processing component 115. The video processing component 115 could then use this watermark identifier together with information identifying the video content playing on the client device to determine the determined supplemental content related to the identifier. The video processing component 115 could then provide the supplemental content to the client device for display.

In one embodiment, the video processing component 115 is configured to determine the content related to the known entity upon receiving the timestamp from the client device. For instance, the video processing component 115 could associate the identifier with the known content entity and, upon receiving a timestamp corresponding to the identifier from a client device, the video processing component 115 could determine the supplemental content related to the known content entity (e.g., by querying a content selection component 125 for content related to the known content entity). The video processing component 115 could then provide at least a portion of the supplemental content to the client device for display together with the video content.

Figure 5:
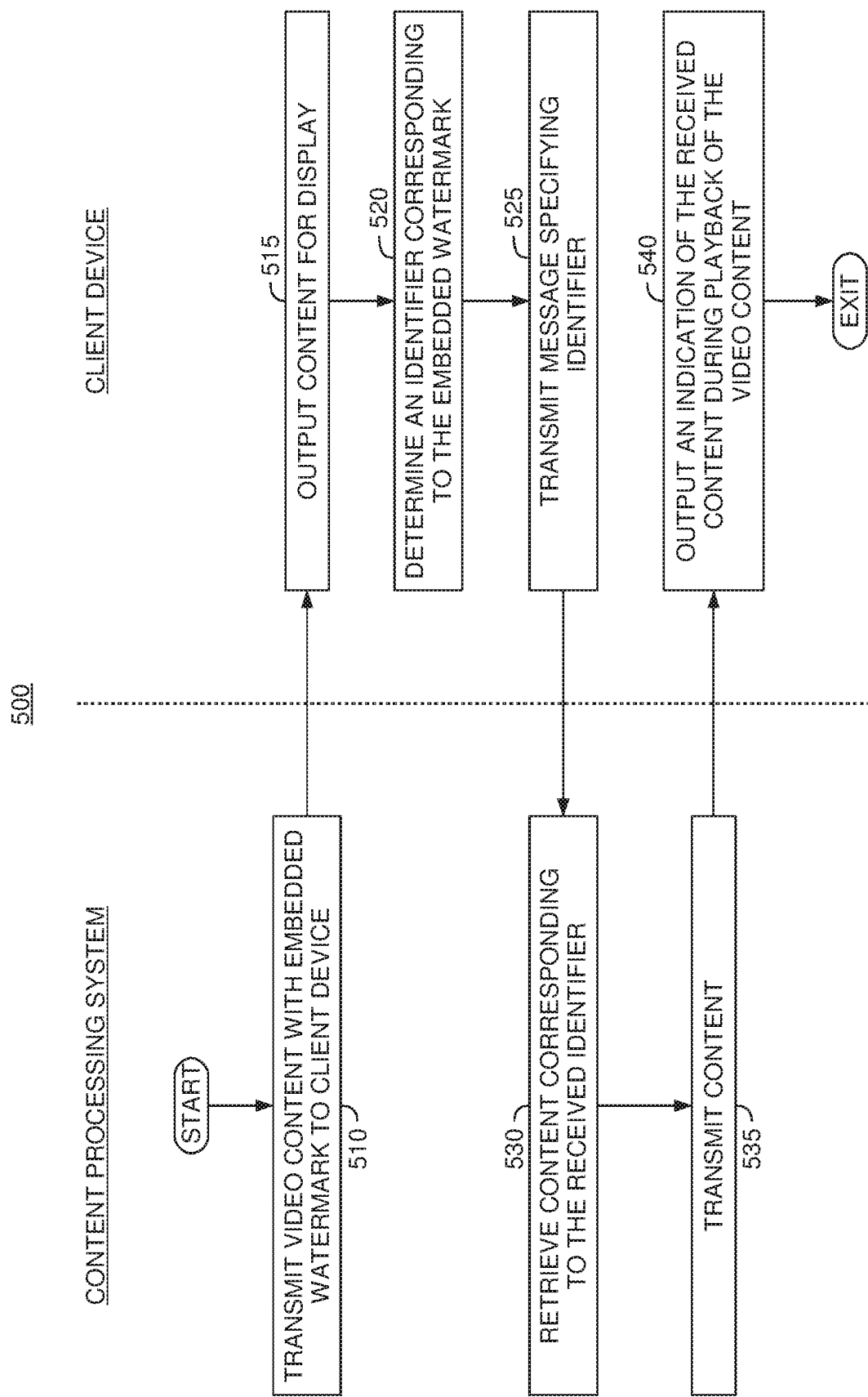
FIG. 5 is a flow diagram illustrating a method for providing supplemental content for a video stream containing an embedded watermark, according to one embodiment described herein.

FIG. 5 is a flow diagram illustrating a method for providing supplemental content for a video stream containing an embedded watermark, according to one embodiment described herein. As shown, the method 500 begins at block 510, where a video processing component 115 on a content processing system transmits video content with an embedded watermark to a client device. Upon receiving the video content, the client device outputs the video content for display using a video player component 145 (block 515). The video player component 145 then determines an identifier corresponding to the embedded watermark within the video content (block 520). For example, the identifier could be a timestamp value corresponding to the position within the video content at which the watermark is embedded. The video player component 145 transmits a message specifying the identifier to the video processing component 115 on the content processing system (block 525).

In one embodiment, a first video player component 145 (e.g., within a television set display device) can be configured to receive the video content containing the embedded watermark and to output the video content for playback. In such an embodiment, a second video player component 145 running on a separate device (e.g., a personal computing device, a tablet computing device, a mobile device, etc.) can detect the embedded audio watermark within the video content being played back using one or more sensors of the separate device (e.g., a microphone). The second video player component 145 could then transmit the message specifying the identifier to the video processing component 115 on the content processing system, responsive to detecting the audio watermark. Advantageously, doing so allows the logic for detecting the watermark and transmitting the identifier to be deployed on a separate device from the one used to playback the video content, and thus allows any generic display device (e.g., a television device receiving a broadcast television signal) to be used to output the video content.

Upon receiving the message specifying the identifier (e.g., a timestamp corresponding to the watermark embedded within the video content), the video processing component 115 retrieves content corresponding to the received identifier (block 530). For example, the message could specify a watermark identifier (e.g., a timestamp at which the watermark was detected) and could further specify a unique identifier that identifies the video content playing on the client device. As discussed above, the message could further specify a client identifier which the content selection component 125 could use to refine the selection of supplemental content. The video processing component 115 could then use the watermark identifier and the unique identifier for the video content to determine the known content entity. For instance, the video processing component 115 could be configured to create a mapping of the identifier and unique identifier to the known content entity, at the time the video processing component 115 inserted the watermark into the video content. The video processing component 115 could then reference this mapping upon receiving the message from the client device.

Once the video processing component 115 determines the known content entity corresponding to the embedded watermark, the video processing component 115 retrieves supplemental content associated with the known content entity. For instance, the video processing component 115 could query a content selection component 125 specifying an identifier for the known content entity and the content selection component 125 could return content (e.g., from a database) corresponding to the known content entity. Additionally, in embodiments where the transmitted message specifies a client identifier for the client device, the content selection component 125 could refine the selection of supplemental content using the client identifier (e.g., by selecting only content the client identifier has access to view).

Upon retrieving the supplemental content, the video processing component 115 transmits at least a portion of the content to the client device (block 535). The video player component 145 on the client device receives the supplemental content and outputs an indication of the received content during the playback of the video content (block 540), and the method 500 ends. For example, the supplemental content could include biography information for a particular actor and an audio clip for an interview with the particular actor. Upon receiving this information, the video player component 145 could update a user interface displayed on the client device to display an indication of the retrieved content. For example, the video player component 145 could update the interface to include links to the received supplemental content that, if selected, cause the retrieved content to be output on the client device.

Figure 6:
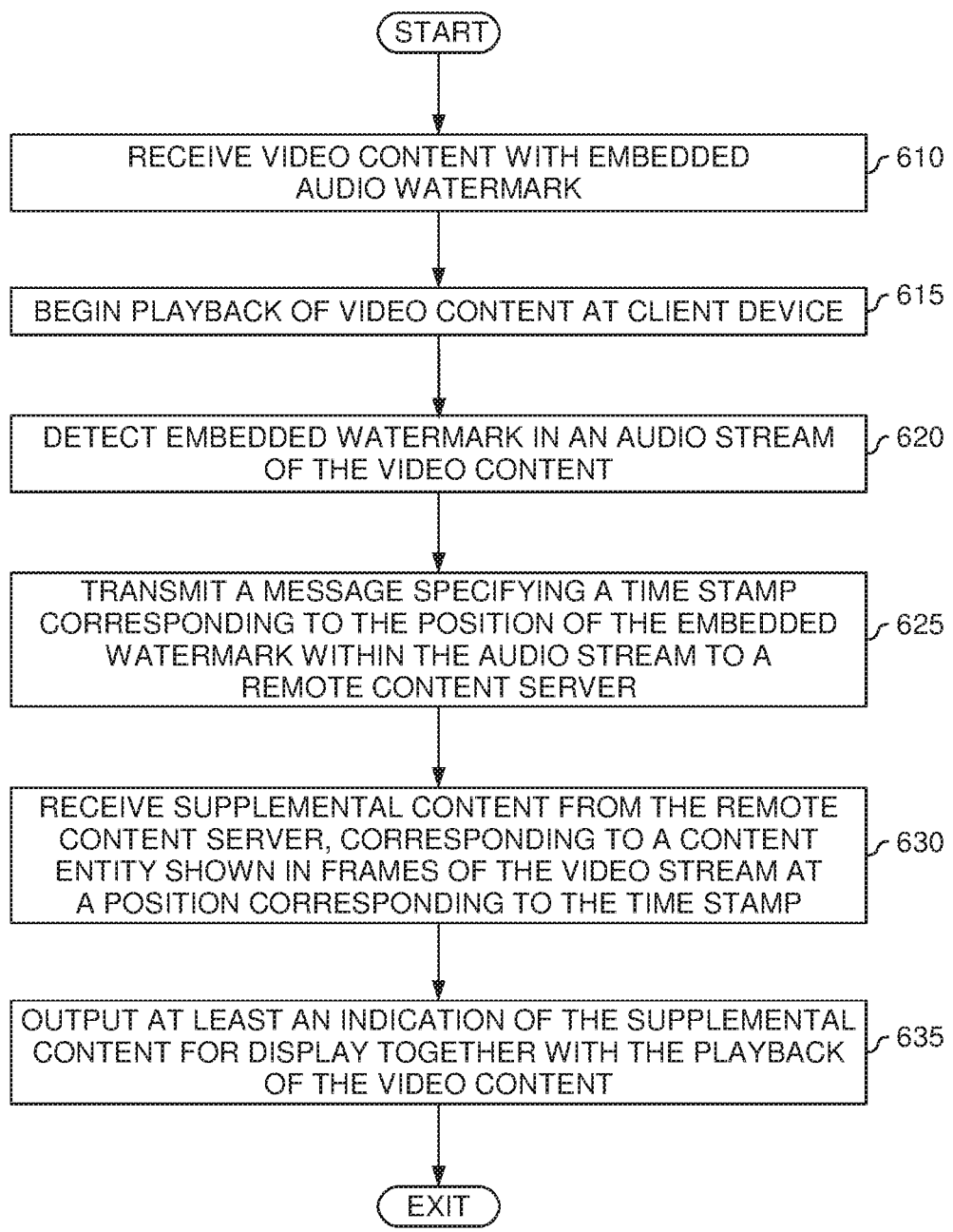
FIG. 6 is a flow diagram illustrating a method for playing video content containing an embedded watermark together with supplemental content at a client device, according to one embodiment described herein.

FIG. 6 is a flow diagram illustrating a method for playing video content containing an embedded watermark together with supplemental content at a client device, according to one embodiment described herein. As shown, the method 600 begins at block 610, where the video player component 145 on a client device receives video content containing an embedded audio watermark. For example, the watermark could have been inserted into the audio stream of the video content using the method 400 discussed above. The method 600 continues as the video player component 145 begins playback of the video content (block 615). The video player component 145 detects the embedded watermark within an audio stream of the video content (block 620) and, in response, transmits a message specifying a timestamp corresponding to the position of the embedded watermark to a remote content server (block 625).

In such an embodiment, the remote server may have previously created a mapping between the video content and the timestamp of the watermark to a particular content entity (e.g., when the watermark was first embedded within the video content at the position corresponding to the timestamp), and the remote server could then use this information to determine the particular content entity corresponding to the timestamp. The remote server could then retrieve supplemental content corresponding to the particular content entity and could return this supplemental content to the client device. The video player component 145 on the client device receives the supplemental content from the remote content server (block 30) and outputs at least an indication of the supplemental content for display together with the playback of the video content (block 635), and the method 600 ends. For example, the video player component 145 could provide one or more links in an overlay to the video content that, when selected, cause the video player component 145 to output the corresponding instance of supplemental content on the client device.

Figure 7:
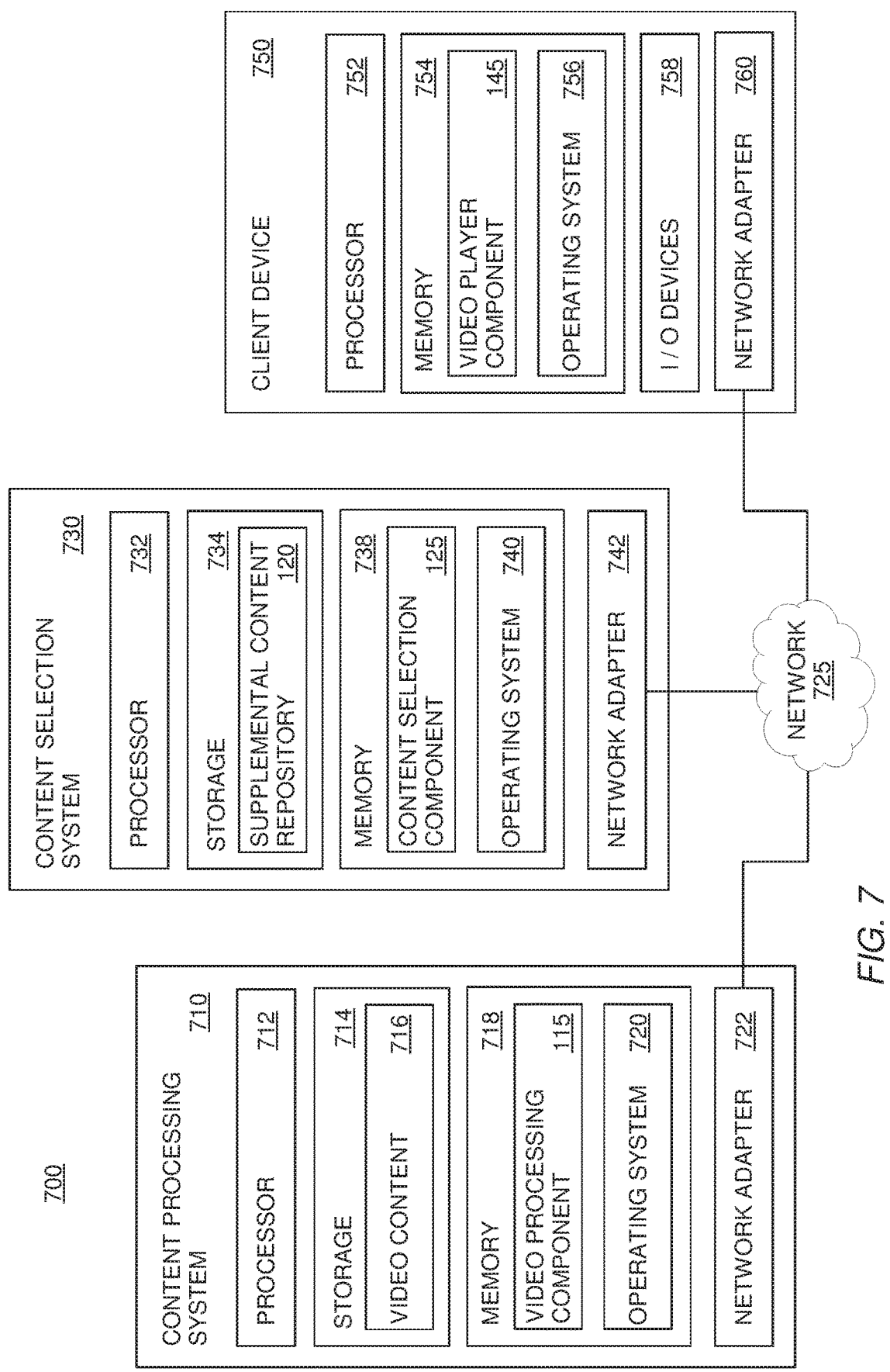
FIG. 7 is a block diagram illustrating a system for providing supplemental content for video content, according to one embodiment described herein.

FIG. 7 is a block diagram illustrating a system for providing supplemental content for video content, according to one embodiment described herein. As shown, the system 700 includes a content processing system 710, a content selection system 730 and a client device 750, interconnected via a network 725. Generally, the network 725 represents any data communication network capable of connecting the systems 710, 730 and 750. For example, the network 725 could be a TCP/IP network, e.g., the Internet.

The content processing system 710 includes a processor 712, storage 714, memory 718, and a network adapter 722. Generally, the processor 710 retrieves and executes programming instructions stored in the memory 718. Processor 710 is included to be representative of a single CPU, multiple CPUs, a single CPU having multiple processing cores, GPUs having multiple execution paths, and the like. The memory 718 is generally included to be representative of a random access memory. Further, while the depicted embodiment illustrates the components of a particular content processing system 710, one of ordinary skill in the art will recognize that interactive objects may use a variety of different hardware architectures. Moreover, it is explicitly contemplated that embodiments may be implemented using any device or computer system capable of performing the functions described herein.

The memory 718 represents any memory sufficiently large to hold the necessary programs and data structures. Memory 718 could be one or a combination of memory devices, including Random Access Memory, nonvolatile or backup memory (e.g., programmable or Flash memories, read-only memories, etc.). In addition, memory 718 and storage 714 may be considered to include memory physically located elsewhere; for example, on another computer communicatively coupled to the system 710. Illustratively, the memory 718 includes a video processing component 115 and an operating system 720. The operating system 720 generally controls the execution of application programs on the system 710. Examples of operating system 720 include UNIX, a version of the Microsoft Windows® operating system, and distributions of the Linux® operating system.

As shown, storage 714 contains video content 716. Generally, as discussed above, the video processing component 115 could analyze the video content 716 to identify a known content entity within two or more frames of the video data. For example, the video processing component 115 could determine that a particular sequence of frames within the video content 716 contain a depiction of a particular actor. The video processing component 115 could further determine, for each of the frames in the sequence of frames, a region of pixels within the respective frame that correspond to the known content entity. For example, the video processing component 115 could identify a region of pixels in each of the frames that depict the particular actor identified within the frames. The video processing component 115 could then embed a watermark at a first position within the video content 716, such that the watermark corresponds to an identifier associated with the known content entity. For example, the video processing component 115 could embed the watermark at a position corresponding to the identified sequence of frames (e.g., a position of the first frame in the sequence) and could save a timestamp corresponding to the position together with an indicator of the known content entity, such that the timestamp can subsequently be used to look-up the known content entity.

The content selection system 730 includes processor 732, storage 734, memory 738 and network adapter 742. Generally, the processor 732 retrieves and executes programming instructions stored in the memory 738. Processor 732 is included to be representative of a single CPU, multiple CPUs, a single CPU having multiple processing cores, GPUs having multiple execution paths, and the like. The memory 738 is generally included to be representative of a random access memory. Further, while the depicted embodiment illustrates the components of a particular content selection system 730, one of ordinary skill in the art will recognize that interactive objects may use a variety of different hardware architectures. Moreover, it is explicitly contemplated that embodiments may be implemented using any device or computer system capable of performing the functions described herein.

The memory 738 represents any memory sufficiently large to hold the necessary programs and data structures. Memory 738 could be one or a combination of memory devices, including Random Access Memory, nonvolatile or backup memory (e.g., programmable or Flash memories, read-only memories, etc.). In addition, memory 738 and storage 734 may be considered to include memory physically located elsewhere; for example, on another computer communicatively coupled to the system 730. Illustratively, the memory 738 includes a content selection component 125 and an operating system 740. The operating system 740 generally controls the execution of application programs on the system 730. Examples of operating system 740 include UNIX, a version of the Microsoft Windows® operating system, and distributions of the Linux® operating system.

As shown, storage 734 contains a supplemental content repository 120. In one embodiment, the supplemental content repository 120 represents a database managed by a database management system (DBMS) on the content selection system 730. Generally, the content selection component 125 is configured to access the supplemental content repository 120 to retrieve supplemental content for a particular known content entity. For example, the content selection component 125 could receive a request specifying a particular content entity and could generate a query adapted to retrieve content associated with the specified content entity from the supplemental content repository 120. In an embodiment where the supplemental content repository 120 comprises a database containing supplemental content, the content selection component 125 could then submit the query to the DBMS to be executed against the supplemental content repository 120.

The client device 750 includes processor 752, memory 754, I/O devices 758 and network adapter 760. Generally, the processor 752 retrieves and executes programming instructions stored in the memory 754. Processor 752 is included to be representative of a single CPU, multiple CPUs, a single CPU having multiple processing cores, GPUs having multiple execution paths, and the like. The memory 754 is generally included to be representative of a random access memory. Further, while the depicted embodiment illustrates the components of a particular client device 750, one of ordinary skill in the art will recognize that interactive objects may use a variety of different hardware architectures. In one embodiment, the client device 750 is implemented using a television set device (e.g., a "smart" television set device). Moreover, it is explicitly contemplated that embodiments may be implemented using any device or computer system capable of performing the functions described herein.

The memory 754 represents any memory sufficiently large to hold the necessary programs and data structures. Memory 754 could be one or a combination of memory devices, including Random Access Memory, nonvolatile or backup memory (e.g., programmable or Flash memories, read-only memories, etc.). In addition, memory 754 may be considered to include memory physically located elsewhere; for example, on another computer communicatively coupled to the client device 750. Illustratively, the memory 754 includes a video player component 145 and an operating system 756. The operating system 756 generally controls the execution of application programs on the client device 750. Examples of operating system 756 include UNIX, a version of the Microsoft Windows® operating system, and distributions of the Linux® operating system. Additional examples of operating system 756 include custom operating systems for gaming consoles, including the custom operating systems for systems such as the Nintendo DS® and Sony PSP®.

Generally, the video player component 145 is configured to playback video content on the client device 750, e.g., for output using a display device of I/O devices 758. Additionally, the video player component 145 could detect a watermark embedded within the video content being played back and could determine a timestamp associated with the watermark (e.g., the timestamp corresponding to the position at which the watermark is embedded within an audio stream of the video content). The video player component 145 could then transmit the timestamp to a content server, such as the content processing system 710. Upon receiving the timestamp information, the video processing component 115 could look-up a known content entity corresponding to the timestamp information and could query the content selection component 125 specifying an identifier for the known content entity to retrieve supplemental content for the content entity. The video processing component 115 could then return the supplemental content to the video player component 145 and the video player component 145 could output at least an indication of the supplemental content. For example, the video player component 145 could display an indication of the supplemental content adjacent to the playback of the video data.

Although the video player component 145 is depicted in FIG. 7 as residing within a single client device 750, this is for illustrative purposes only and without limitation. In one embodiment, the logic of the video player component 145 is distributed across two or more separate devices. For example, a television set could be configured to receive broadcast audiovisual data containing an embedded audio watermark and could output the audiovisual data for display. Continuing the example, a separate device (e.g., a personal computer device, a tablet device, a mobile device, etc.) configured with the video player component 145 could detect the embedded audio watermark during playback of the audiovisual data (e.g., using one or more sensors, such as a microphone device), and in response, could transmit a watermark identifier (e.g., a timestamp, a video content identifier, a client device identifier, a combination thereof, and so on) to a content server, such as the content processing system 710. As discussed above, the video processing component 115 on the content processing system could then return supplemental content to the client device 750 (e.g., requested content retrieved from the supplemental content repository 120 via the content selection component 125), at which point the supplemental content could be displayed on the client device 750 using I/O devices 758. Advantageously, doing so allows the video player component 145 to retrieve supplemental content corresponding to known content entities within a broadcast television stream, regardless of the television set on which the broadcast television stream is played. That is, by detecting the embedded audio watermark using a sensor device (e.g., a microphone), the video player component 145 on the client device 750 can be configured to work with any television set without requiring the television set to be preconfigured with any additional logic.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the video processing component 115 could execute on a computing system in the cloud and could process video content to identify content entities within frames of the video content. Likewise, the content selection component 125 could be deployed on a cloud computing system and could determine supplemental content corresponding to the detected content entity within the video content. The video processing component 115 could then embed a watermark within an audio stream of the video content and the content selection component 125, upon receiving an identifier corresponding to the embedded watermark from a client device, could return at least a portion of the supplemental content to the client device for display. Doing so allows client devices to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
analyzing video data for a first instance of video content to identify a character in a scene depicted within two or more frames of a plurality of frames of the video data, wherein the character is identified in at least one frame of the two or more frames based at least in part on a corresponding identification in at least one adjacent frame;
determining, for each of the two or more frames, a region of pixels within the respective frame that correspond to the character, including normalizing the region of pixels across the two or more frames;
generating a mapping between the character, and a data value pair specifying (i) a content identifier that uniquely identifies the first instance of video content and (ii) a timestamp corresponding to a first position within the first instance of video content where the character was identified;
receiving, from a remote client device, a message specifying (i) the content identifier that uniquely identifies the first instance of video content and (ii) the timestamp corresponding to the first position within the first instance of video content;
determining that the message pertains to the character by accessing the mapping using the timestamp and the content identifier specified within the message;
determining supplemental content having a predefined correspondence with the character; and
transmitting at least a portion of the supplemental content having the predefined correspondence with the character to the remote client device, for output together with the video data.

2. The computer-implemented method of claim 1, wherein the character is identified in the at least one frame via a temporal consistency enhancement operation across the plurality frames of the video data;
wherein the region of pixels is normalized via a segmentation refinement operation across the two or more frames of the video data, wherein the segmentation refinement operation comprises at least one of an object segmentation refinement operation or a character segmentation refinement operation;
wherein the message further specifies a client identifier that uniquely identifies the remote client device;
wherein the supplemental content is determined based at least in part on a device profile corresponding to the client identifier for the remote client device.

3. The computer-implemented method of claim 1, wherein the computer-implemented method is performed by a remote content server operatively connected to the remote client device via a network, the remote content server including a plurality of components comprising a video processing component, a content repository component, and a content selection component;
wherein the character in the scene is identified based on a predefined processing workflow that includes an input stage, an identification stage, a refinement stage, a linkage stage, a watermarking stage, and an output stage.

4. The computer-implemented method of claim 3, wherein the input stage includes a selection of the video content for processing by the video processing component;
wherein the identification stage includes an analysis of the first instance of the video content in order to automatically identify the character in the scene, based on a determination that a region of pixels in the plurality of frames of the scene substantially match a predefined region of pixels in a predefined scene other than the scene, the predefined region of pixels pertaining to the character;
wherein the refinement stage includes a temporal consistency enhancement operation and a segmentation refinement operation; and
wherein the linkage stage includes identification of the supplemental content as being associated with the character and further includes creation of a link between the supplemental content and at least the two or more frames.

5. The computer-implemented method of claim 3, wherein the computer-implemented method further comprises embedding a watermark within the video data based on the first position, wherein the timestamp is determined by the remote client device based on the remote client device detecting the watermark within the video data and without requiring user action;
wherein the output stage includes an output of the video content containing the watermark and further includes an output of a summary of (i) all characters within the video content, (ii) all scenes within the video content, and (iii) for each character, all scenes within the video content in which the respective character appears.

6. The computer-implemented method of claim 1, wherein the supplemental content is determined by:
(i) determining one or more types of content that have been indicated as preferred content types when historically played on the remote client device, wherein a preference is given to the preferred content types in determining the supplemental content; or (ii) determining, based on a client identifier uniquely identifying the remote client device, a plurality of instances of supplemental content that the remote client device is authorized to access, wherein the supplemental content is selected from only the plurality of instances of supplemental content, and wherein at least one instance of supplemental content that the remote client device is not authorized to access is excluded.

7. The computer-implemented method of claim 1, wherein analyzing the video data to identify the character within two or more frames of the video data comprises receiving a user input specifying a portion of at least one of the two or more frames of video data that corresponds to the character; and wherein the region of pixels for each of the two or more frames is determined based on the received user input;

wherein determining the supplemental content having the predefined correspondence with the character comprises:

generating a query adapted to return the supplemental content having the predefined correspondence with the character, wherein the query is generated based on a client identifier; and responsive to submitting the query to a database system for execution, receiving at least an indication of the supplemental content from the database system.

8. The computer-implemented method of claim 1, further comprising embedding an audio watermark within an audio stream of the video data, wherein the audio watermark is embedded within the audio stream based on the first position;

wherein playback of the video data is output in a playback region of a user interface, wherein outputting the video data for display comprises:

(i) outputting at least an indication of the supplemental content within the user interface in a region adjacent to the playback region;

(ii) outputting the at least the indication of the supplemental content within the user interface as an overlay on top of the playback region; or (iii) outputting the at least the indication of the supplemental content as one or more links, such that an instance of the supplemental content is loaded within the user interface responsive to a corresponding link of the one or more links being selected;

wherein the supplemental content comprises at least one of (i) image data, (ii) audio data, (iii) video data, (iv) bibliographical data, or (v) textual data.

9. The computer-implemented method of claim 1, further comprising:

embedding an audio watermark within an audio stream of the video data, based on the first position.

10. The computer-implemented method of claim 1, wherein analyzing the video data to identify the character within two or more frames of the video data comprises:

receiving a user input specifying a portion of at least one frame of the two or more frames of video data that corresponds to the character; and wherein the region of pixels for each of the two or more frames is determined based on the received user input.

11. The computer-implemented method of claim 1, wherein the supplemental content comprises at least one of: (i) image data, (ii) audio data, (iii) video data, (iv) bibliographical data, or (v) textual data.

12. The computer-implemented method of claim 1, wherein a temporal consistency enhancement operation is performed across the plurality of frames of the video data in order to provide consistency in identifying the character within the two or more frames.

13. The computer-implemented method of claim 1, wherein a segmentation refinement operation is performed across the two or more frames of the video data in order to provide consistency of the region of pixels corresponding to the character with respect to both space and time, wherein the segmentation refinement operation comprises at least one of an object segmentation refinement operation or a character segmentation refinement operation.

14. The computer-implemented method of claim 1, wherein the character comprises at least one of (i) a fictional character or (ii) a non-fictional character.

15. The computer-implemented method of claim 1, wherein determining the supplemental content comprises generating a query adapted to return the supplemental content having the predefined correspondence with the character, wherein the query is generated based on a client identifier corresponding to the remote client device.

16. A non-transitory computer-readable medium containing program code that, when executed by operation of one or more computer processors, performs an operation comprising:

analyzing video data for a first instance of video content to identify a character in a scene depicted within two or more frames of a plurality of frames of the video data, wherein the character is identified in at least one frame of the two or more frames based at least in part on a corresponding identification in at least one adjacent frame;

determining, for each of the two or more frames, a region of pixels within the respective frame that correspond to the character, including normalizing the region of pixels across the two or more frames;

generating a mapping between the character and a data value pair specifying (i) a content identifier that uniquely identifies the first instance of video content and (ii) a timestamp corresponding to a first position within the first instance of video content where the character was identified;

receiving, from a remote client device, a message specifying (i) a content identifier that uniquely identifies the first instance of video content and (ii) the timestamp corresponding to the first position within the first instance of video content;

determining that the message pertains to the character by accessing the mapping using the timestamp and the content identifier specified within the message;

determining supplemental content having a predefined correspondence with the character; and transmitting at least a portion of the supplemental content having the predefined correspondence with the character to the remote client device, for output together with the video data.

17. The non-transitory computer-readable medium of claim 16, wherein the operation further comprises:

embedding an audio watermark within an audio stream of the video data, based on the first position.

18. The non-transitory computer-readable medium of claim 16, wherein a temporal consistency enhancement operation is performed across the plurality of frames of the video data in order to provide consistency in identifying the character within the two or more frames.

19. The non-transitory computer-readable medium of claim 16, wherein a segmentation refinement operation is performed across the two or more frames of the video data in order to provide consistency of the region of pixels corresponding to the character with respect to both space and time, wherein the segmentation refinement operation comprises at least one of an object segmentation refinement operation or a character segmentation refinement operation.

20. A system comprising:
one or more computer processors; and
a memory containing a program that, when executed by the one or more computer processors, performs an operation comprising:
analyzing video data for a first instance of video content to identify a character in a scene depicted within two or more frames of a plurality of frames of the video data, wherein the character is identified in at least one frame of the two or more frames based at least in part on a corresponding identification in at least one adjacent frame;
determining, for each of the two or more frames, a region of pixels within the respective frame that correspond to the character, including normalizing the region of pixels across the two or more frames;
generating a mapping between the character and a data value pair specifying (i) a content identifier that uniquely identifies the first instance of video content and (ii) a timestamp corresponding to a first position within the first instance of video content where the character was identified;
receiving, from a remote client device, a message specifying (i) a content identifier that uniquely identifies the first instance of video content and (ii) the timestamp corresponding to the first position within the first instance of video content;
determining that the message pertains to the character by accessing the mapping using the timestamp and the content identifier specified within the received message;
determining supplemental content having a predefined correspondence with the character; and
transmitting at least a portion of the supplemental content having the predefined correspondence with the character to the remote client device, for output together with the video data.

\* \* \* \* \*

UNITED STATES PATENT AND TRADEMARK OFFICE
CERTIFICATE OF CORRECTION

PATENT NO. : 10,694,263 B2  
APPLICATION NO. : 16/178135  
DATED : June 23, 2020  
INVENTOR(S) : Anthony M. Accardo et al.

Page 1 of 1

It is certified that error appears in the above-identified patent and that said Letters Patent is hereby corrected as shown below:

In the Claims

In Column 17, Line 52, in Claim 1, delete "character," and insert -- character --, therefor.

Signed and Sealed this
Twenty-second Day of September, 2020

Andrei Iancu
*Director of the United States Patent and Trademark Office*